US006829685B2

(12) United States Patent
Neal et al.

(10) Patent No.: US 6,829,685 B2
(45) Date of Patent: Dec. 7, 2004

(54) OPEN FORMAT STORAGE SUBSYSTEM APPARATUS AND METHOD

(75) Inventors: Danny Marvin Neal, Round Rock, TX (US); Gregory Francis Pfister, Austin, TX (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 09/999,143

(22) Filed: Nov. 15, 2001

(65) Prior Publication Data

US 2003/0093627 A1 May 15, 2003

(51) Int. Cl.[7] .............................................. G06F 12/00
(52) U.S. Cl. ..................................................... 711/153
(58) Field of Search ................................. 711/153, 163, 711/173; 710/316

(56) References Cited

U.S. PATENT DOCUMENTS 6,502,162 B2 * 12/2002 Blumenau et al. ............. 711/5
6,594,712 B1 * 7/2003 Pettey et al. ................. 710/22
6,690,757 B1 * 2/2004 Bunton et al. ............ 375/371
2002/0103943 A1 * 8/2002 Lo et al. ........................ 710/2
2003/0005039 A1 * 1/2003 Craddock et al. .......... 709/203
2003/0061379 A1 * 3/2003 Craddock et al. .......... 709/238

* cited by examiner

Primary Examiner—Hiep T. Nguyen
(74) Attorney, Agent, or Firm—Duke W. Yee; Mark E. McBurney; Stephen J. Walder, Jr.

(57) ABSTRACT

An open format storage subsystem and method are provided. The storage subsystem and method include at least one host endnode, at least one processing unit endnode, and at least one storage endnode. These endnodes are partitioned according to partition tables assigned to the ports of the endnodes and partition keys assigned to queue pairs of the ports. Based on these partition keys, partitions in the storage subsystem are designated. In this way, certain endnodes may be designated as being able to communicate with only certain other ones of the endnodes. Because of the partitioning mechanism of the present invention, an open format storage subsystem is formulated such that the types of endnodes in the storage subsystem are not limited to vendor specific units. This enhances the ability to add and remove units from the storage subsystem by removing the limitations typically found in closed storage subsystems.

41 Claims, 10 Drawing Sheets

OPEN FORMAT STORAGE SUBSYSTEM APPARATUS AND METHOD

BACKGROUND OF THE INVENTION

1. Technical Field

The present invention generally relates to storage subsystems and their internal communications as well as their communication with host computer system and, more particularly, with how high-function storage subsystems can be created without any internal communication unique to their subsystem. More specifically, relates to a technique for providing all of the functions of a closed storage subsystems without requiring either the storage media or the processing units involved to be hardware unique to a single vendor.

2. Description of Related Art

Storage subsystems today are structured so that they physically include both processing power and storage media, which includes such elements as disks, tapes, etc. It is on these storage media the storage subsystems operate.

Processing power is provided by one or more commonly used computers. The storage media is attached to the input/output (I/O) system of a computer, or a plurality of computers, also referred to as client systems. Specifically, the storage media is attached to an adapter that allows communication with a client systems by a communication mechanism such as fiber channel (FC), Serial Storage Architecture (SSA), etc. The storage media are typically connected using a facility, such as the small computer system interface (SCSI), SSA, or the like.

The processing power provides various functions, such as backup, and reflection to remote storage for disaster recovery, and the like. A main memory of the storage subsystem is used to cache data from the storage media.

The processing unit provides functions that are desirous for users or customers. Further, it is also desirable to encapsulate the storage media inside the storage unit because this prohibits undesired (non storage subsystem) access to the data stored on the storage media.

However, known systems that have the storage media embedded in the storage unit, sometimes referred to as closed storage subsystems, are undesirable. The embedded system locks or limits a user into the storage elements sold or produced by a particular vendor or a manufacturer of the storage subsystem. Since unique packaging and other characteristics can be defined or applied by the storage system vendor or manufacturer, they are vendor specific. Thus, the vendor specific storage subsystem makes it more difficult for end user modification of the subsystem. This also makes it more difficult to upgrade to new, better storage products, since they must be adapted to the storage subsystem. For example, if more storage is needed in the closed system, the only option is to buy from the original vendor or vendor specific products because of compatibility issues.

Therefore, it would be desirous to have a storage subsystem wherein the storage media or elements are not vendor specific.

SUMMARY OF THE INVENTION

An open format storage subsystem and method are provided. The storage subsystem and method include at least one host endnode, at least one processing unit endnode, and at least one storage endnode. These endnodes are partitioned according to partition tables assigned to the ports of the endnodes and partition keys assigned to queue pairs of the ports.

Based on these partition keys, partitions are defined that restrict access to the storage endnode or endnodes, allowing only the processing unit endnode to control them; and others defined that allow the host or hosts to access the processing endnode or endnodes. This has the effect of encapsulating the storage endnodes within a logical storage subsystem, while allowing access to said storage subsystems's functions by the hosts through the processing unit endnodes. In this way all of the functions provided by prior storage subsystems are provided, but the elements of the storage subsystem, e.g., the processing endnode or endnodes and the storage endnode or endnodes, can be sold or purchased as separate individual units, participating in commodity economies of scale.

These and other features and advantages of the present invention will be described in, or will become apparent to those of ordinary skill in the art in view of, the following detailed description of the preferred embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
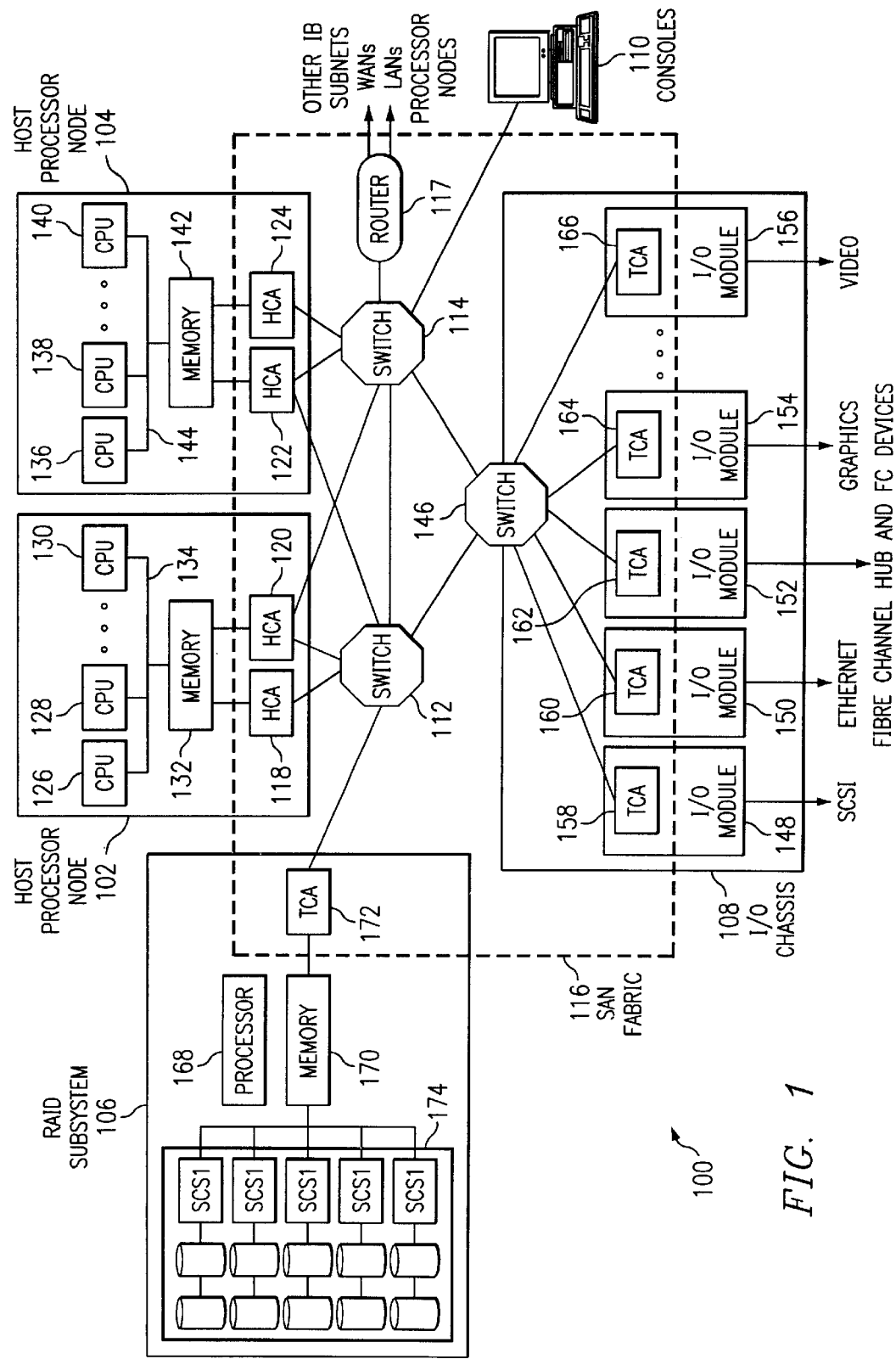
FIG. 1 is a diagram of a distributed computer system in accordance with a preferred embodiment of the present invention.

The present invention provides an apparatus and method for providing an open format storage subsystem. The present invention provides a technique through which all of the functions provided by current closed storage subsystems are obtained without requiring that either the storage media or the processing units involved be hardware unique to a single vendor. Instead, the storage subsystem of the present invention may consist of software only, run on commodity processing units and using commodity storage units. Vendor-unique processing units and storage units can be used also, but they are not required.

The present invention is preferably implemented in a distributed computing system, such as a system area network (SAN) having end nodes, switches, routers, and links interconnecting these components. Each end node uses send and receive queue pairs to transmit and receive messages. The end nodes segment the message into packets and transmit the packets over the links. The switches and routers interconnect the end nodes and route the packets to the appropriate end node. The end nodes reassemble the packets into a message at the destination.

One type of SAN in which the present invention may be used is the InfiniBand (IB) system area network. InfiniBand provides a hardware message passing mechanism which can be used for Input/Output devices (I/O) and Interprocess Communications (IPC) between general computing nodes. Consumers access IB message passing hardware by posting send/receive messages to send/received work queues, respectively, on an IB channel adapter (CA). The send/receive work queues (WQ) area assigned to a consumer as a queue pair (QP). The messages can be sent over five different transport types: Reliable Connected (RC), Reliable Datagram (RD), Unreliable Connected (UC), Unreliable Datagram (UD), and Raw Datagram (RawD). Consumers retrieve the results of these messages from a completion queue (CQ) through IB send and receive work completions (WC). The source CA takes care of segmenting outbound messages and sending them to the destination. The destination CA takes care of reassembling inbound messages and placing them in the memory space designated by the destination's consumer. There are two CA types: Host CA and Target CA. The Host CA is used by general purpose computing nodes to access the IB fabric. Consumers use IB verbs to access Host CA functions. The software that interprets verbs and directly accesses the CA is known as the Channel Interface (CI).

In addition, InfiniBand architecture defines a partitioning facility that restricts communication among its attached endnodes to only those nodes that are allowed to communicate by the customer and/or allowed to communicate by an installed subsystem. This can be used to "wall off" particular collections of nodes from any communication from outside, except for specific defined connection points. This is implemented by associating partition keys (P_keys) with each packet emitted from a queue pair. These keys can only come from a table of P_Keys associated with each node that is accessible only by a management entity logically residing outside any of the operating systems running on any of the nodes in an InfiniBand subnet. Packets are checked on reception by a queue pair (Receive Queue) against the same table. Packets with P_Keys not in the table are dropped.

FIG. 1 is a diagram of a distributed computer system in accordance with a preferred embodiment of the present invention. The distributed computer system represented in FIG. 1 takes the form of a system area network (SAN) 100 and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet.

SAN 100 is a high-bandwidth, low-latency network interconnecting nodes within the distributed computer system. A node is any component attached to one or more links of a network and forming the origin and/or destination of messages within the network. In the depicted example, SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can connect any number and any type of independent processor nodes, I/O adapter nodes, and I/O device nodes. Any one of the nodes can function as an endnode, which is herein defined to be a device that originates or finally consumes messages or frames in SAN 100.

In one embodiment of the present invention, an error handling mechanism in distributed computer systems is present in which the error handling mechanism allows for reliable connection or reliable datagram communication between end nodes in distributed computing system, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the frame through SAN. The trailer generally contains control and cyclic redundancy check (CRC) data for ensuring packets are not delivered with corrupted contents.

SAN 100 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low latency in a secure, remotely managed environment. Endnodes can communicate over multiple ports and utilize multiple paths through the SAN fabric. The multiple ports and paths through the SAN shown in FIG. 1 can be employed for fault tolerance and increased bandwidth data transfers.

The SAN 100 in FIG. 1 includes switch 112, switch 114, switch 146, and router 117. A switch is a device that connects multiple links together and allows routing of packets from one link to another link within a subnet using a small header Destination Local Identifier (DLID) field. A router is a device that connects multiple subnets together and is capable of routing frames from one link in a first subnet to another link in a second subnet using a large header Destination Globally Unique Identifier (DGUID).

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types, endnodes, such as host processor endnodes and I/O adapter endnodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In one embodiment, each channel adapter is an endpoint that implements the channel adapter interface in sufficient detail to source or sink packets transmitted on SAN fabric 100. Host processor node 102 contains channel adapters in the form of host channel adapter 118 and host channel adapter 120. Host processor node 104 contains host channel adapter 122 and host channel adapter 124. Host processor node 102 also includes central processing units 126–130 and a memory 132 interconnected by bus system 134. Host processor node 104 similarly includes central processing units 136–140 and a memory 142 interconnected by a bus system 144.

Host channel adapters 118 and 120 provide a connection to switch 112 while host channel adapters 122 and 124 provide a connection to switches 112 and 114.

In one embodiment, a host channel adapter is implemented in hardware. In this implementation, the host channel adapter hardware offloads much of central processing unit and I/O adapter communication overhead. This hardware implementation of the host channel adapter also permits multiple concurrent communications over a switched network without the traditional overhead associated with communicating protocols. In one embodiment, the host channel adapters and SAN 100 in FIG. 1 provide the I/O and interprocessor communications (IPC) consumers of the distributed computer system with zero processor-copy data transfers without involving the operating system kernel process, and employs hardware to provide reliable, fault tolerant communications.

As indicated in FIG. 1, router 116 is coupled to wide area network (WAN) and/or local area network (LAN) connections to other hosts or other routers. The I/O chassis 108 in FIG. 1 includes an I/O switch 146 and multiple I/O modules 148–156. In these examples, the I/O modules take the form of adapter cards. Example adapter cards illustrated in FIG. 1 include a SCSI adapter card for I/O module 148; an adapter card to fiber channel hub and fiber channel-arbitrated loop (FC-AL) devices for I/O module 152; an ethernet adapter card for I/O module 150; a graphics adapter card for I/O module 154; and a video adapter card for I/O module 156. Any known type of adapter card can be implemented. I/O adapters also include a switch in the I/O adapter backplane to couple the adapter cards to the SAN fabric. These modules contain target channel adapters 158–166.

In this example, RAID subsystem node 106 in FIG. 1 includes a processor 168, a memory 170, a target channel adapter (TCA) 172, and multiple redundant and/or striped storage disk unit 174. Target channel adapter 172 can be a fully functional host channel adapter.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as host channel adapters, which enable efficient message passing protocols. SAN 100 is suited to current computing models and is a building block for new forms of I/O and computer cluster communication. Further, SAN 100 in FIG. 1 allows I/O adapter nodes to communicate among themselves or communicate with any or all of the processor nodes in distributed computer system. With an I/O adapter attached to the SAN 100, the resulting I/O adapter node has substantially the same communication capability as any host processor node in SAN 100.

In one embodiment, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both necessary for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem target channel adapter (TCA) 172. The disk I/O adapter examines the command and uses memory semantics to read the data buffer directly from the memory space of the host processor node. After the data buffer is read, the disk I/O adapter employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computed system are not required to use physical addressing for any operations.

Figure 2:
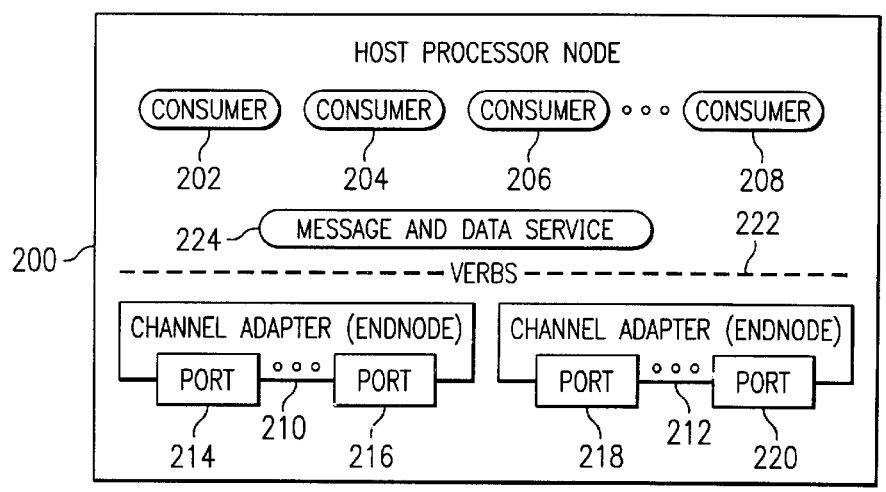
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200 shown in FIG. 2 includes a set of consumers 202–208, which are processes executing on host processor node 200. Host processor node 200 also includes channel adapter 210 and channel adapter 212. Channel adapter 210 contains ports 214 and 216 while channel adapter 212 contains ports 218 and 220. Each port connects to a link. The ports can connect to one SAN subnet or multiple SAN subnets, such as SAN 100 in FIG. 1. In these examples, the channel adapters take the form of host channel adapters.

Consumers 202–208 transfer messages to the SAN via the verbs interface 222 and message and data service 224. A verbs interface is essentially an abstract description of the functionality of a host channel adapter. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through channel adapter 210 and channel adapter 212. Message and data service 224 provides an interface to consumers 202–208 to process messages and other data.

Figure 3A:
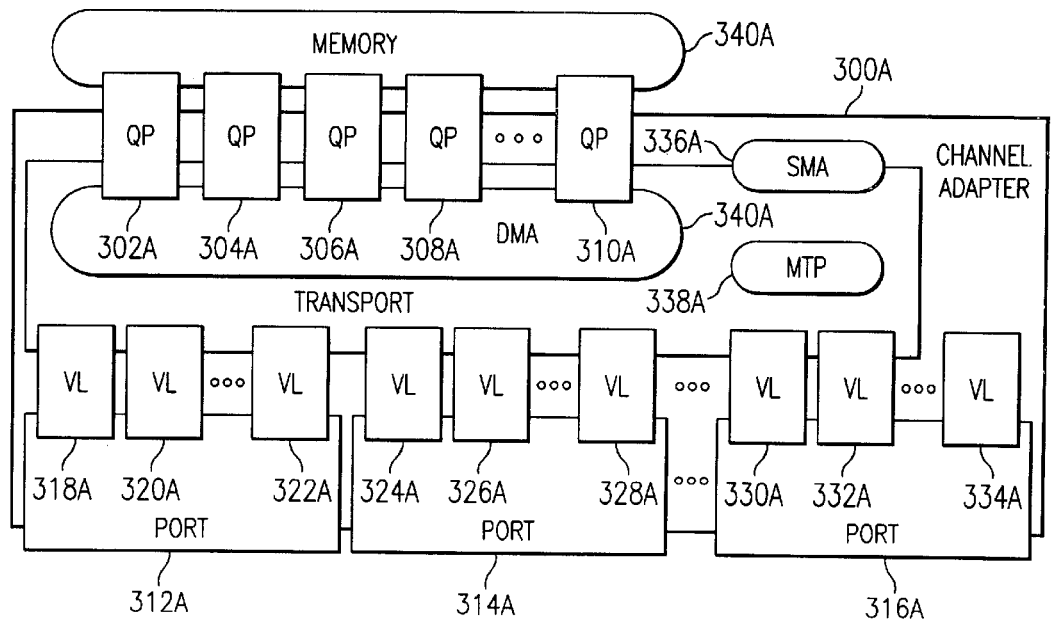
FIG. 3A is a diagram of a host channel adapter in accordance with a preferred embodiment of the present invention.

With reference now to FIG. 3A, a diagram of a host channel adapter is depicted in accordance with a preferred embodiment of the present invention. Host channel adapter 300A shown in FIG. 3A includes a set of queue pairs (QPs) 302–310A, which are used to transfer messages to the host channel adapter ports 312A–316A. Buffering of data to host channel adapter ports 312A–316A is channeled through virtual lanes (VL) 318A–334A where each VL has its own flow control. Subnet manager configures channel adapters with the local addresses for each physical port, i.e., the port's LID. Subnet manager agent (SMA) 336A is the entity that communicates with the subnet manager for the purpose of configuring the channel adapter. Memory translation and protection (MTP) 338A is a mechanism that translates virtual addresses to physical addresses and validates access rights. Direct memory access (DMA) 340A provides for direct memory access operations using memory 340A with respect to queue pairs 302–310A.

A single channel adapter, such as the host channel adapter 300A shown in FIG. 3A, can support thousands of queue pairs. By contrast, a target channel adapter in an I/O adapter typically supports a much smaller number of queue pairs. Each queue pair consists of a send work queue (SWQ) and a receive work queue. The send work queue is used to send channel and memory semantic messages. The receive work queue receives channel semantic messages. A consumer calls an operating-system specific programming interface, which is herein referred to as verbs, to place work requests (WRs) onto a work queue.

Figure 3B:
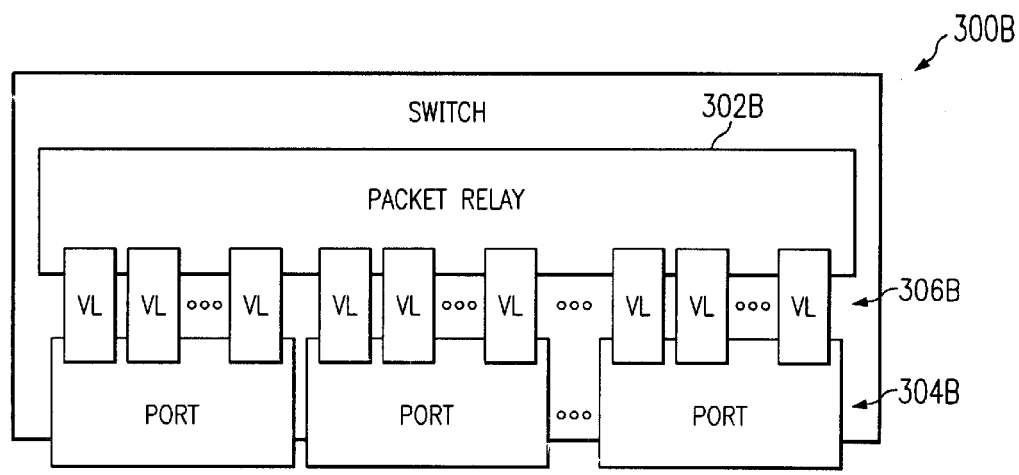
FIG. 3B is a diagram of a switch in accordance with a preferred embodiment of the present invention.

FIG. 3B depicts a switch 300B in accordance with a preferred embodiment of the present invention. Switch 300B includes a packet relay 302B in communication with a number of ports 304B through virtual lanes such as virtual lane 306B. Generally, a switch such as switch 300B can route packets from one port to any other port on the same switch.

Figure 3C:
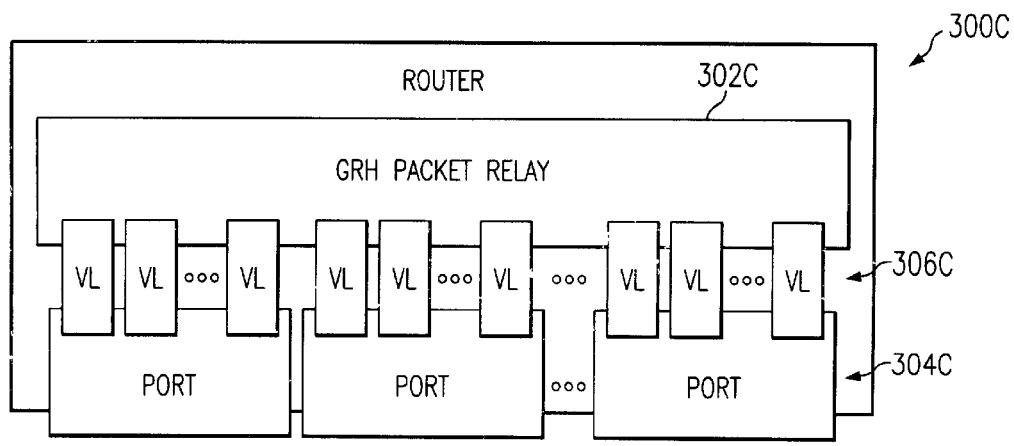
FIG. 3C is a diagram of a router in accordance with a preferred embodiment of the present invention.

Similarly, FIG. 3C depicts a router 300C according to a preferred embodiment of the present invention. Router 300C includes a packet relay 302C in communication with a number of ports 304C through virtual lanes such as virtual lane 306C. Like switch 300B, router 300C will generally be able to route packets from one port to any other port on the same router.

Channel adapters, switches, and routers employ multiple virtual lanes within a single physical link. As illustrated in FIGS. 3A, 3B, and 3C, physical ports connect endnodes, switches, and routers to a subnet. Packets injected into the SAN fabric follow one or more virtual lanes from the packet's source to the packet's destination. The virtual lane that is selected is mapped from a service level associated with the packet. At any one time, only one virtual lane makes progress on a given physical link. Virtual lanes provide a technique for applying link level flow control to one virtual lane without affecting the other virtual lanes. When a packet on one virtual lane blocks due to contention, quality of service (QoS), or other considerations, a packet on a different virtual lane is allowed to make progress. Virtual lanes are employed for numerous reasons, some of which are as follows: Virtual lanes provide QoS. In one example embodiment, certain virtual lanes are reserved for high priority or isochronous traffic to provide QoS.

Virtual lanes provide deadlock avoidance. Virtual lanes allow topologies that contain loops to send packets across all physical links and still be assured the loops won't cause back pressure dependencies that might result in deadlock.

Virtual lanes alleviate head-of-line blocking. When a switch has no more credits available for packets that utilize a given virtual lane, packets utilizing a different virtual lane that has sufficient credits are allowed to make forward progress.

Figure 4:
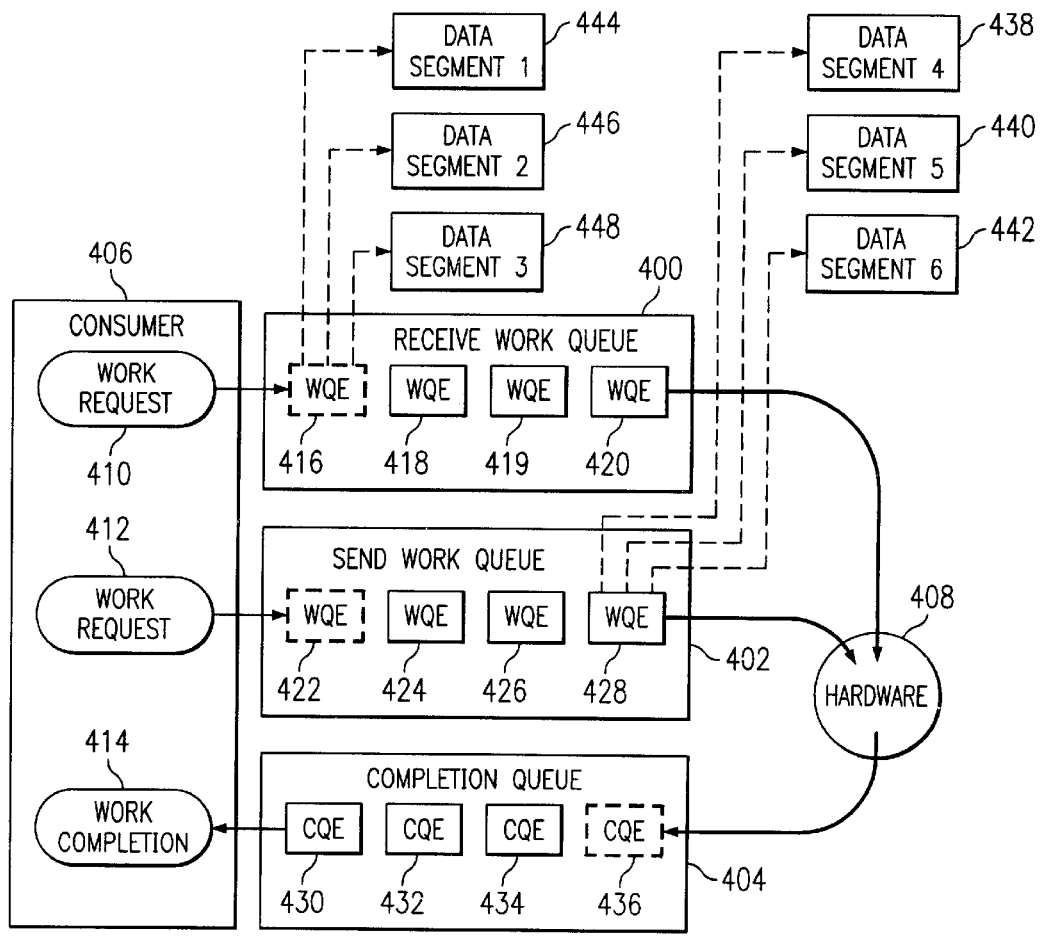
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 402 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQEs) 422–428, describing data to be transmitted on the SAN fabric. Receive work queue 400 contains work queue elements (WQEs) 416–420, describing where to place incoming channel semantic data from the SAN fabric. A work queue element is processed by hardware 408 in the host channel adapter.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for the send work queue 402 shown in FIG. 4 are as follows. A send work request is a channel semantic operation to push a set of local data segments to the data segments referenced by a remote node's receive work queue element. For example, work queue element 428 contains references to data segment 4

438, data segment 5 440, and data segment 6 442. Each of the send work request's data segments contains a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA Read work request reads a virtually contiguous memory space on a remote endnode and writes the data to a virtually contiguous local memory space. Similar to the send work request, virtual addresses used by the RDMA Read work queue element to reference the local data segments are in the address context of the process that created the local queue pair. For example, work queue element 416 in receive work queue 400 references data segment 1 444, data segment 2 446, and data segment 448. The remote virtual addresses are in the address context of the process owning the remote queue pair targeted by the RDMA Read work queue element.

A RDMA Write work queue element provides a memory semantic operation to write a virtually contiguous memory space on a remote node. The RDMA Write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal.

A bind (unbind) remote access key (R_Key) work queue element provides a command to the host channel adapter hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports four types of transport services: reliable, unreliable, reliable datagram, and unreliable datagram connection service.

Reliable and Unreliable connected services associate a local queue pair with one and only one remote queue pair. Connected services require a process to create a queue pair for each process that is to communicate with over the SAN fabric. Thus, if each of N host processor nodes contain P processes, and all P processes on each node wish to communicate with all the processes on all the other nodes, each host processor node requires $P^2 \times (N-1)$ queue pairs. Moreover, a process can connect a queue pair to another queue pair on the same host channel adapter.

Figure 5:
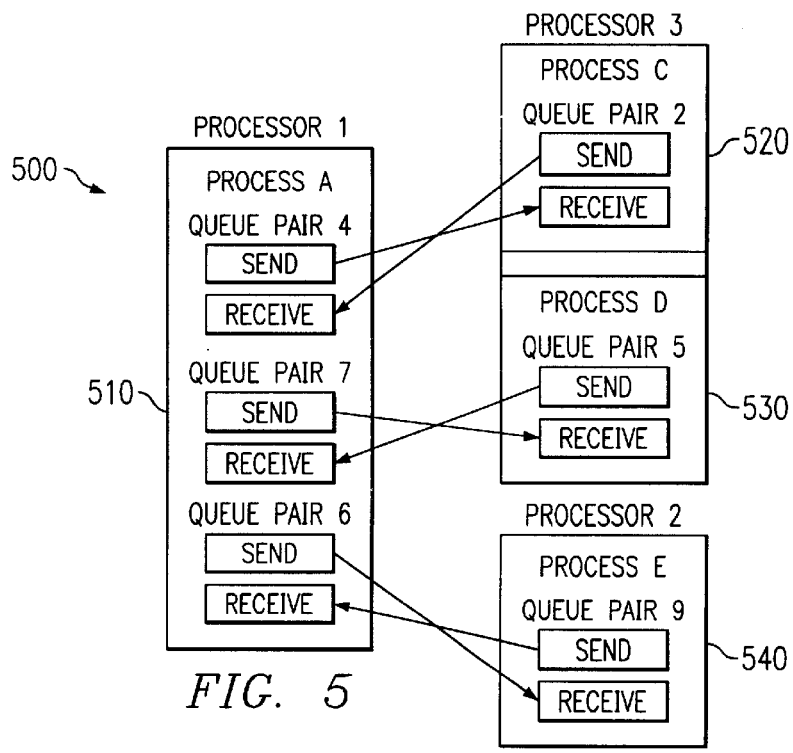
FIG. 5 is a diagram illustrating a portion of a distributed computer system in accordance with a preferred embodiment of the present invention in which a reliable connection service is used.

A portion of a distributed computer system employing a reliable connection service to communicate between distributed processes is illustrated generally in FIG. 5. The distributed computer system 500 in FIG. 5 includes a host processor node 1, a host processor node 2, and a host processor node 3. Host processor node 1 includes a process A 510. Host processor node 2 includes a process C 520 and a process D 530. Host processor node 3 includes a process E 540.

Host processor node 1 includes queue pairs 4, 6 and 7, each having a send work queue and receive work queue. Host processor node 2 has a queue pair 9 and host processor node 3 has queue pairs 2 and 5. The reliable connection service of distributed computer system 500 associates a local queue pair with one an only one remote queue pair. Thus, the queue pair 4 is used to communicate with queue pair 2; queue pair 7 is used to communicate with queue pair 5; and queue pair 6 is used to communicate with queue pair 9.

A WQE placed on one queue pair in a reliable connection service causes data to be written into the receive memory space referenced by a Receive WQE of the connected queue pair. RDMA operations operate on the address space of the connected queue pair.

In one embodiment of the present invention, the reliable connection service is made reliable because hardware maintains sequence numbers and acknowledges all packet transfers. A combination of hardware and SAN driver software retries any failed communications. The process client of the queue pair obtains reliable communications even in the presence of bit errors, receive underruns, and network congestion. If alternative paths exist in the SAN fabric, reliable communications can be maintained even in the presence of failures of fabric switches, links, or channel adapter ports.

In addition, acknowledgments may be employed to deliver data reliably across the SAN fabric. The acknowledgment may, or may not, be a process level acknowledgment, i.e. an acknowledgment that validates that a receiving process has consumed the data. Alternatively, the acknowledgment may be one that only indicates that the data has reached its destination.

Reliable datagram service associates a local end-to-end (EE) context with one and only one remote end-to-end context. The reliable datagram service permits a client process of one queue pair to communicate with any other queue pair on any other remote node. At a receive work queue, the reliable datagram service permits incoming messages from any send work queue on any other remote node.

The reliable datagram service greatly improves scalability because the reliable datagram service is connectionless. Therefore, an endnode with a fixed number of queue pairs can communicate with far more processes and endnodes with a reliable datagram service than with a reliable connection transport service. For example, if each of N host processor nodes contain P processes, and all P processes on each node wish to communicate with all the processes on all the other nodes, the reliable connection service requires $P^2 \times (N-1)$ queue pairs on each node. By comparison, the connectionless reliable datagram service only requires P queue pairs+(N−1) EE contexts on each node for exactly the same communications.

Figure 6:
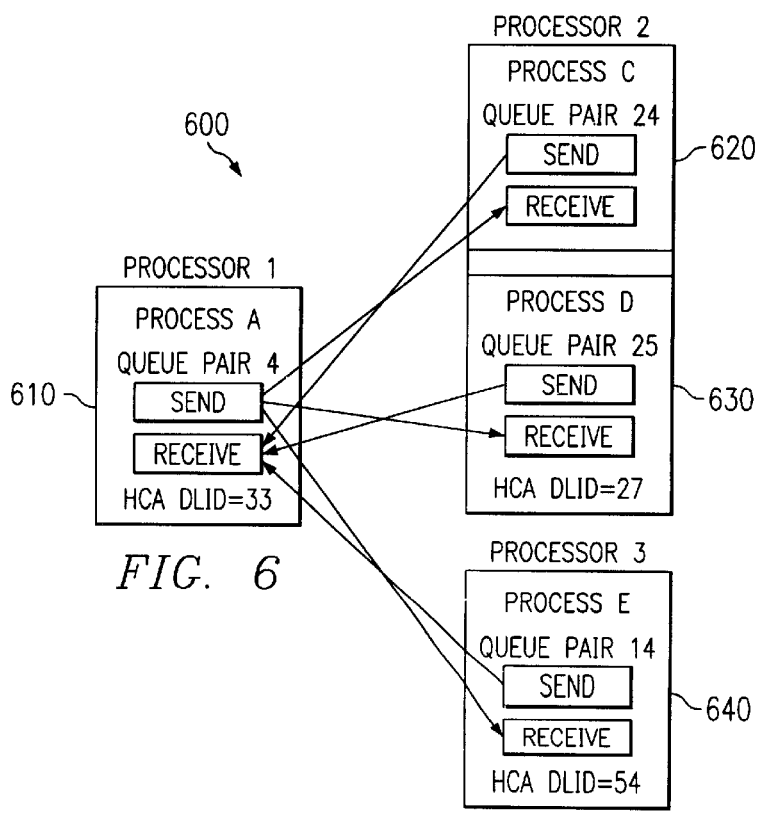
FIG. 6 is a diagram illustrating a portion of a distributed computer system in accordance with a preferred embodiment of the present invention in which reliable datagram service connections are used.

A portion of a distributed computer system employing a reliable datagram service to communicate between distributed processes is illustrated in FIG. 6. The distributed computer system 600 in FIG. 6 includes a host processor node 1, a host processor node 2, and a host processor node 3. Host processor node 1 includes a process A 610 having a queue pair 4. Host processor node 2 has a process C 620 having a queue pair 24 and a process D 630 having a queue pair 25. Host processor node 3 has a process E 640 having a queue pair 14.

In the reliable datagram service implemented in the distributed computer system 600, the queue pairs are coupled in what is referred to as a connectionless transport service. For example, a reliable datagram service couples queue pair 4 to queue pairs 24, 25 and 14. Specifically, a reliable datagram service allows queue pair 4's send work queue to reliably transfer messages to receive work queues in queue pairs 24, 25 and 14. Similarly, the send queues of queue pairs 24, 25, and 14 can reliably transfer messages to the receive work queue in queue pair 4.

In one embodiment of the present invention, the reliable datagram service employs sequence numbers and acknowledgments associated with each message frame to ensure the same degree of reliability as the reliable connection service. End-to-end (EE) contexts maintain end-to-end specific state to keep track of sequence numbers, acknowledgments, and time-out values. The end-to-end state held in the EE contexts is shared by all the connectionless queue pairs communication between a pair of endnodes. Each endnode requires at least one EE context for every endnode it wishes to communicate with in the reliable datagram service (e.g., a given endnode requires at least N EE contexts to be able to have reliable datagram service with N other endnodes).

The unreliable datagram service is connectionless. The unreliable datagram service is employed by management applications to discover and integrate new switches, routers, and endnodes into a given distributed computer system. The unreliable datagram service does not provide the reliability guarantees of the reliable connection service and the reliable datagram service. The unreliable datagram service accordingly operates with less state information maintained at each endnode.

Figure 7:
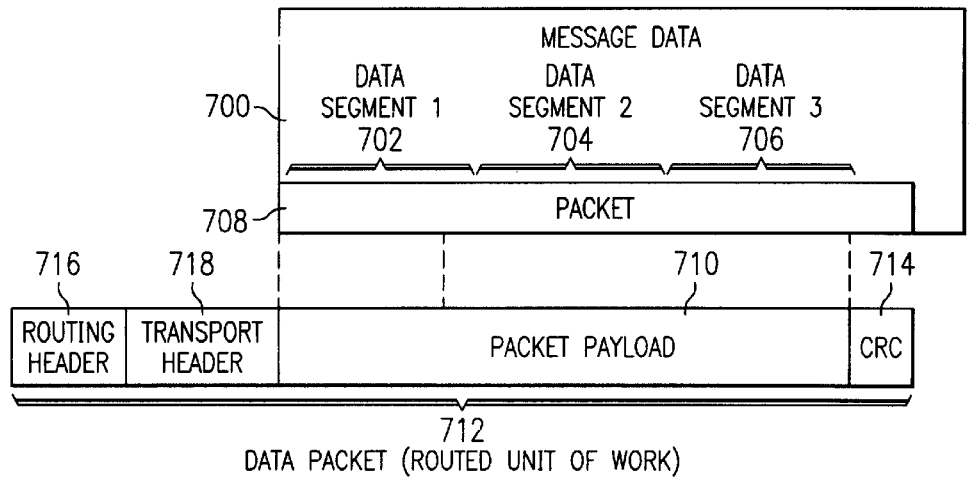
FIG. 7 is an illustration of a data packet in accordance with a preferred embodiment of the present invention.

Turning next to FIG. 7, an illustration of a data packet is depicted in accordance with a preferred embodiment of the present invention. A data packet is a unit of information that is routed through the SAN fabric. The data packet is an endnode-to-endnode construct, and is thus created and consumed by endnodes. For packets destined to a channel adapter (either host or target), the data packets are neither generated nor consumed by the switches and routers in the SAN fabric. Instead for data packets that are destined to a channel adapter, switches and routers simply move request packets or acknowledgment packets closer to the ultimate destination, modifying the variant link header fields in the process. Routers, also modify the packet's network header when the packet crosses a subnet boundary. In traversing a subnet, a single packet stays on a single service level.

Message data 700 contains data segment 1 702, data segment 2 704, and data segment 3 706, which are similar to the data segments illustrated in FIG. 4. In this example, these data segments form a packet 708, which is placed into packet payload 710 within data packet 712. Additionally, data packet 712 contains CRC 714, which is used for error checking. Additionally, routing header 716 and transport 718 are present in data packet 712. Routing header 716 is used to identify source and destination ports for data packet 712. Transport header 718 in this example specifies the destination queue pair for data packet 712. Additionally, transport header 718 also provides information such as the operation code, packet sequence number, and partition for data packet 712.

The operating code identifies whether the packet is the first, last, intermediate, or only packet of a message. The operation code also specifies whether the operation is a send RDMA write, read, or atomic. The packet sequence number is initialized when communication is established and increments each time a queue pair creates a new packet. Ports of an endnode may be configured to be members of one or more possibly overlapping sets called partitions.

Figure 8:
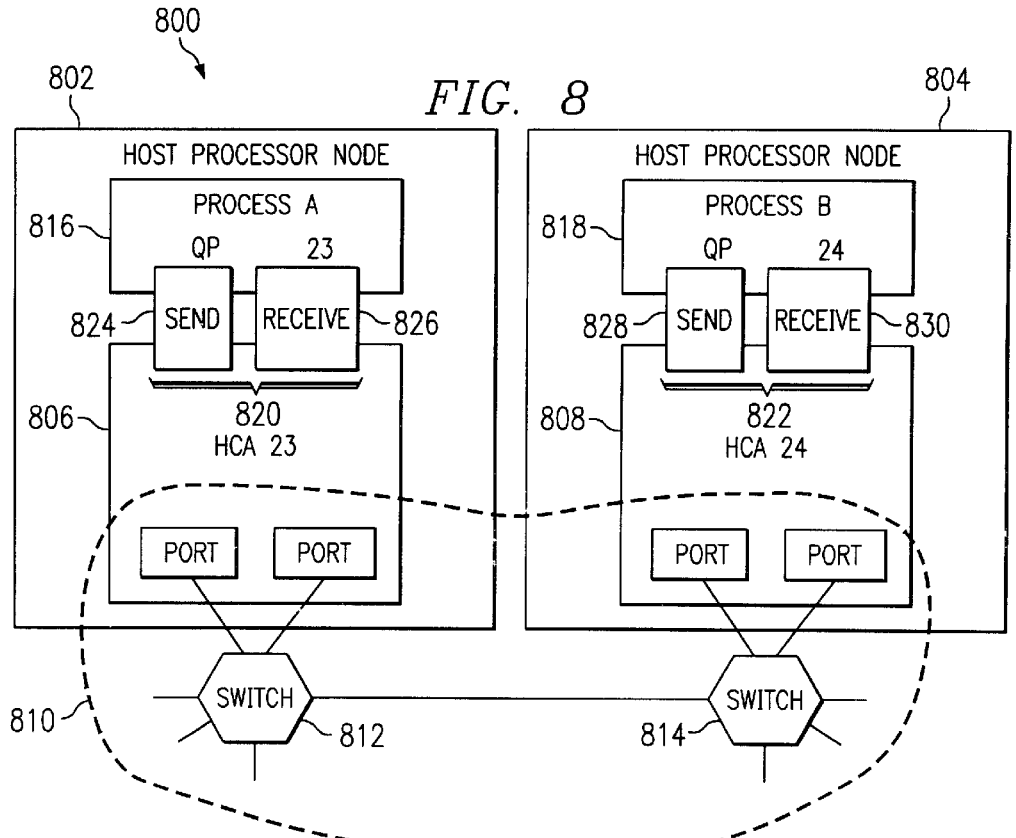
FIG. 8 is a diagram illustrating a portion of a distributed computer system in accordance with a preferred embodiment of the present invention.

In FIG. 8, a portion of a distributed computer system is depicted to illustrate an example request and acknowledgment transaction. The distributed computer system in FIG. 8 includes a host processor node 802 and a host processor node 804. Host processor node 802 includes a host channel adapter 806. Host processor node 804 includes a host channel adapter 808. The distributed computer system in FIG. 8 includes a SAN fabric 810, which includes a switch 812 and a switch 814. The SAN fabric includes a link coupling host channel adapter 806 to switch 812; a link coupling switch 812 to switch 814; and a link coupling host channel adapter 808 to switch 814.

In the example transactions, host processor node 802 includes a client process A. Host processor node 804 includes a client process B. Client process A interacts with host channel adapter hardware 806 through queue pair 824. Client process B interacts with hardware channel adapter hardware 808 through queue pair 828. Queue pairs 824 and 828 are data structures that include a send work queue and a receive work queue. Process A initiates a message request by posting work queue elements to the send queue of queue pair 824. Such a work queue element is illustrated in FIG. 4. The message request of client process A is referenced by a gather list contained in the send work queue element. Each data segment in the gather list points to a virtually contiguous local memory region, which contains a part of the message, such as indicated by data segments 1, 2, and 3, which respectively hold message parts 1, 2, and 3, in FIG. 4.

Hardware in host channel adapter 806 reads the work queue element and segments the message stored in virtual contiguous buffers into data packets, such as the data packet illustrated in FIG. 7. Data packets are routed through the SAN fabric, and for reliable transfer services, are acknowledged by the final destination endnode. If not successively acknowledged, the data packet is retransmitted by the source endnode. Data packets are generated by source endnodes and consumed by destination endnodes.

Figure 9:
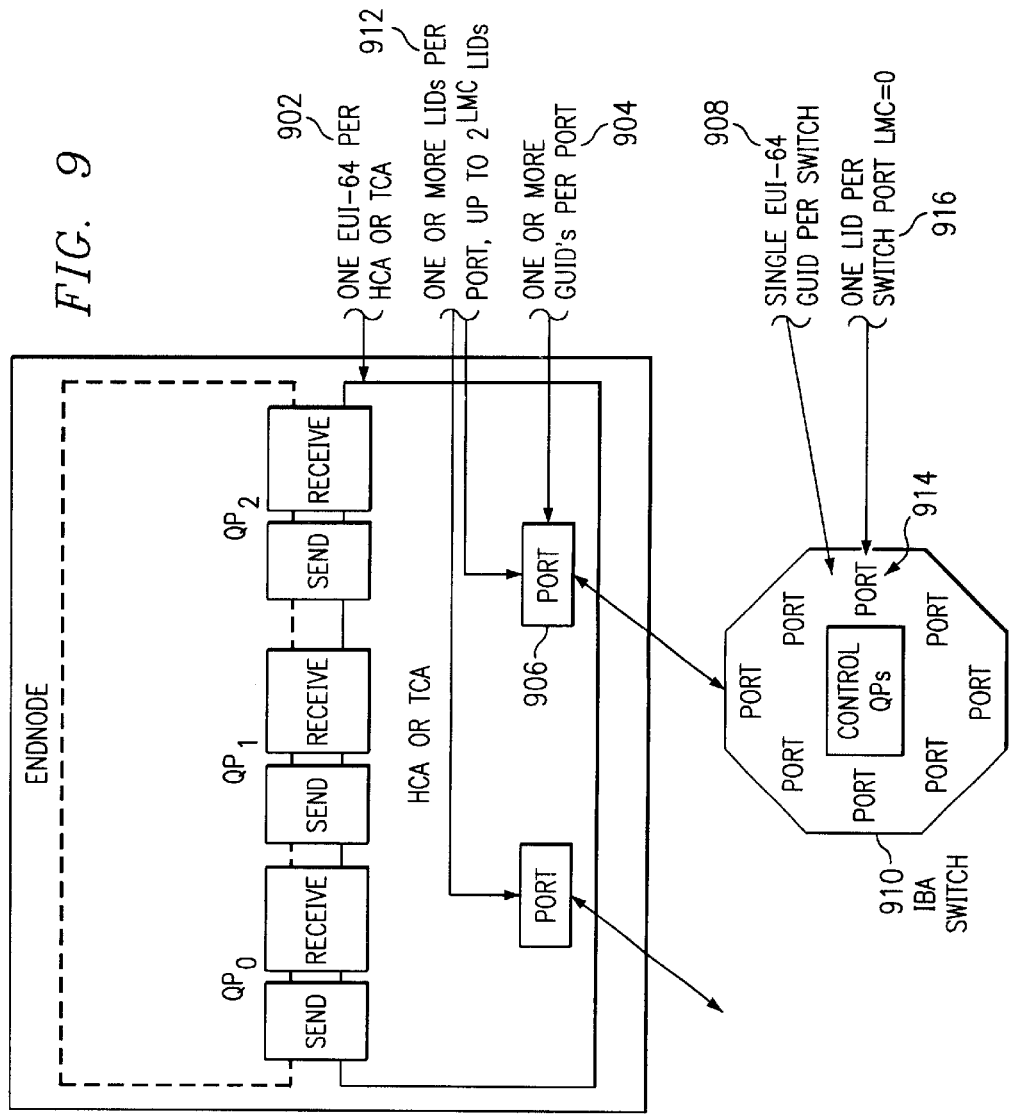
FIG. 9 is a diagram illustrating the network addressing used in a distributed networking system in accordance with the present invention.

In reference to FIG. 9, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an end node specified by the host name. Thus, there is one host name per node, but a node can have multiple CAs. A single IEEE assigned 64-bit identifier (EUI-64) 902 is assigned to each component. A component can be a switch, router, or CA.

One or more globally unique ID (GUID) identifiers 904 are assigned per CA port 906. Multiple GUIDs (a.k.a. IP addresses) can be used for several reasons, some of which are illustrated by the following examples. In one embodiment, different IP addresses identify different partitions or services on an end node. In a different embodiment, different IP addresses are used to specify different Quality of Service (QoS) attributes. In yet another embodiment, different IP addresses identify different paths through intra-subnet routes.

One GUID 908 is assigned to a switch 910.

A local ID (LID) refers to a short address ID used to identify a CA port within a single subnet. In one example embodiment, a subnet has up to $2^{16}$ end nodes, switches, and routers, and the LID is accordingly 16 bits. A source LID (SLID) and a destination LID (DLID) are the source and destination LIDs used in a local network header. A single CA port can have up to $2^{LMC}$ LIDs 912 assigned to it. The LMC represents the LID Mask Control field in the CA. A mask is a pattern of bits used to accept or reject bit patterns in another set of data.

Multiple LIDs can be used for several reasons some of which are provided by the following examples. In one embodiment, different LIDs identify different partitions or services in an end node. In another embodiment, different LIDs are used to specify different QoS attributes. In yet a further embodiment, different LIDs specify different paths through the subnet. A single switch port 914 has one LID 916 associated with it.

A one-to-one correspondence does not necessarily exist between LIDs and GUIDs, because a CA can have more or less LIDs than GUIDs for each port. For CAs with redundant ports and redundant conductivity to multiple SAN fabrics, the CAs can, but are not required to, use the same LID and GUID on each of its ports.

Figure 10:
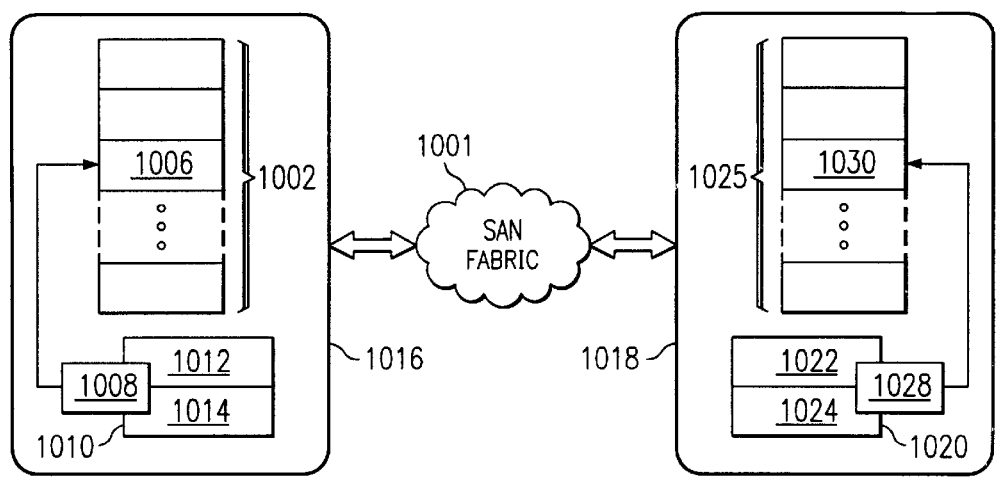
FIG. 10 is a block diagram depicting a relationship between an index of queue pair with a partitioning table.

Referring now to FIG. 10, in addition to the facilities described above, each port on a SAN, such as an InfiniBand SAN fabric, contains an associated P_Key Table, which contains a set of P_Keys (also known as Partition Keys). Under InfiniBand specifications, these P_Keys are 16-bit quantities. A partition key table 1002 includes a set of P_Keys 1004 which are used by queue pairs to determine if a received packet is to be processed by the queue pair or is to be discarded.

In FIG. 10, a source port 1016 and a destination port 1018 are depicted as part of a SAN subnet. As shown in FIG. 10, each port has an associated partition key or P_Key table 1002 and 1025. Each P_Key Table is made up of individual P_Keys 1006 and 1030. In addition, each port 1016 and 1018 has one or more queue pairs 1010 and 1020 made up of a send queue 1012, 1022 and a receive queue 1014, 1024. Each queue pair has an associated index 1008 and 1028 into the P_Key tables 1006 and 1025.

In operation, the P_Key designated by the index of a queue pair, such as index 1008 of queue pair 1010, is placed in the header of every packet sent from the send queue of the queue pair, such as send queue 1012 of queue pair 1010. The P_Key in the header of every packet received at the receive queue, such as receive queue 1024 of queue pair 1020, is compared with the P_Key designated by the index in the header of the packet in the port's P_Key table. If there is not a match, the packet is discarded without giving any notification of that fact to the endnode that sent the packet. This essentially requires that endnodes that are to communicate with one another must have the same P_Key Tables 1002 and 1025 having the same entries.

There is no verb allowing a host to manipulate its own P_Key tables. Their contents are loaded by special management packets originating from the Master Subnet Manager (MSM). Every SAN subnet must have an MSM residing in some node of the subnet. In addition to loading the P_Key tables, the MSM also discovers the network, loads the routing tables in switches, responds to entities connecting to and disconnecting from the subnet (hot plug or unplug), and performs other initialization and management functions. The MSM can optionally authenticate all of its messages using an M_Key (Management Key) which is 64 bits long, held in each node, and which only the MSM can change.

Thus, the requirement to match P_Keys obtained from the P_Key table means that endnodes can only communicate if their P_Key tables 1002 and 1025 contain matching entries. Therefore, by loading the endnodes' P_Key tables appropriately, the MSM can enforce communication patterns within a subnet, i.e. Only those endnodes whose P_Key tables have been loaded with matching P_Key values by the MSM can communicate.

In addition, the P_Keys loaded into a P_Key table can be either full or limited. This is defined by the setting of the high-order bit of the P_Key: 0 indicates full, 1 indicates limited, for example. Full P_Keys arriving in a packet are defined to match either a limited or a full P_Key in the P_Key table, but limited P_Keys arriving in a packet only match a full P_Key in the P_Key table. This means that endnodes with limited P_Keys can communicate with endnodes having full P_Keys, but not with each other. This allows "server" endnodes, with a full P_Key, to communicate with many "client" endnodes, each with a limited P_Key, while keeping the clients from communicating with each other. Hereafter, endnodes having limited P_Keys will be referred to as limited members and endnodes having full P_Keys will be referred to as full members.

Figure 11:
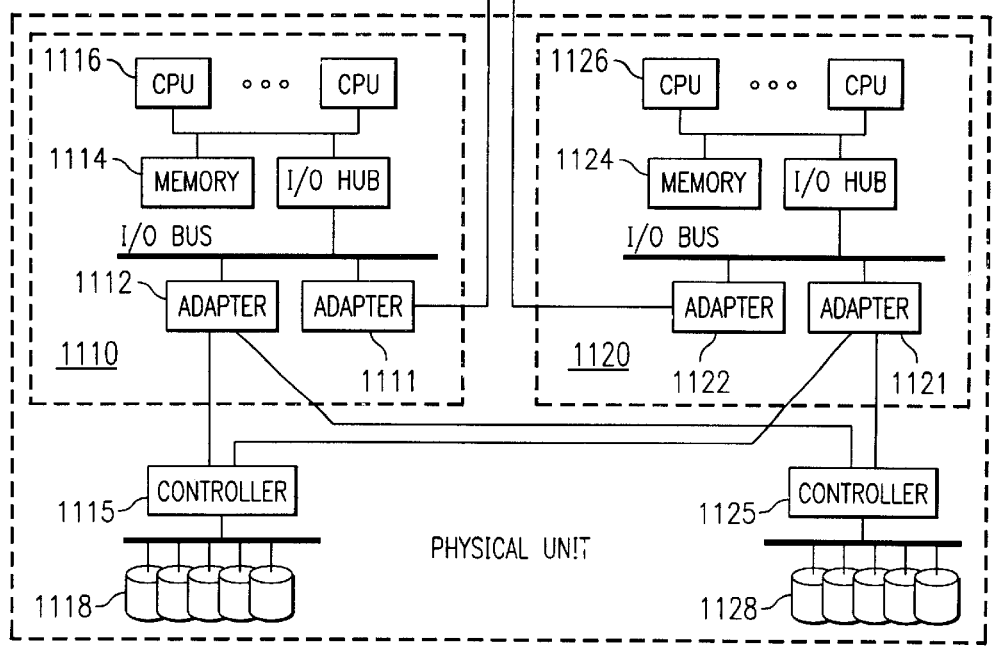
FIG. 11 is block diagram depicting a prior art storage subsystem.

FIG. 11 illustrates an example of a prior art closed storage subsystem. As shown in FIG. 11, the closed storage subsystem 1100 includes two processing nodes 1110 and 1120. These processing nodes 1110 and 1120 communicate with host systems 1130 and 1140 via the communication network 1150 using communications adapters 1111 and 1121. The communications adapters 1111 and 1121 may be, for example, Fibre Channel, Ethernet, or some other medium type communications adapters. The processing nodes 1110 and 1120 also communicate with storage controllers 1115 and 1125 through a different adapter 1112 and 1122, such as a SCSI adapter for example, controlling and storing data on the storage media 1118 and 1128. The processing nodes 1110 and 1120 also communicate with each other; they may use the communication network 1150 to do so, or use another private medium.

The processing units 1116 and 1126 receive messages from the hosts 1130 and 1140 which may contain data to be stored on the storage media 1118 and/or 1128, requests for data from the storage media 1118 and/or 1128, or other operations such as requests to allocate data space for a host, checkpoint data, or copy data to another medium. In the process of storing and retrieving data from the storage media 1118 and 1128, the hosts 1130 and 1140 may also provide functions such as various degrees of redundancy on storage (also known as RAID functions).

When data is transferred to the host, it is done by transferring it first to the memory 1114 or 1124 of the processing unit from the storage media 1118 or 1128. The data is then transferred through the communications adapter 1111 or 1121, through the communication network 1150, to the host 1130 or 1140. This allows the memory 1114 or 1124 to provide a caching function, i.e. holding data for fast access that may be reused in a short time, to thereby save the overhead and time required to store the data on the storage media. This is useful for some data, but not all data. Many storage media accesses simply read through an entire large file without significant reuse, making the intermediate storage in memory unnecessary.

In addition, the fact that the processing units 1110 and 1120 and storage media 1118 and 1128 are tightly coupled means that with most closed format systems, the storage media used must be designed to fit into the system physically, electronically, and logically. This means that the customer must purchase disk storage from the vendor of the closed format subsystem.

FIG. 12 is an exemplary diagram of an alternative open format storage subsystem according to the present invention. Initially it should be appreciated that the various components of the storage subsystem do not necessarily reside in a single physical unit (although this is possible). These components are shown in FIG. 12 as independent individual endnodes on communications network, such as InfiniBand SAN system, which supports I/O connectivity and partitioning. As can be appreciated, the non-single unit, or distributed nature of the open format solution, causes a user to be able to add (or delete) components easily. In particular, the user does not need to use vendor specific components as is the usual practice done in a closed system.

As shown in FIG. 12, processing units 1202, 1204 and storage units 1206, 1208 will typically be members of a partition, 1214, unique to the storage subsystem. This allows the processing units to communicate with the storage units using the SAN, allowing the processing units to control the storage units. Because this partition is unique to the storage subsystem, no other endnodes on the fabric can control the storage units.

Host systems 1210, 1212 and processing units 1202, 1204 are also in a partition 1218, allowing said hosts to communicate with said processing units. This allows storage requests and replies to be communicated between the hosts and the processing units. This partition may be unique to the storage subsystem or may be a commonly used system partition. In addition, in this embodiment, that partition 1218 can have the hosts 1210, 1212 as limited members and the processing units 1202, 1204 as full members, keeping hosts 1210, 1212 from communicating with each other but allowing them to communicate with the processing units 1202, 1204. The processing units 1202, 1204 retain control over the storage units 1206, 1208, not necessarily allowing direct host access, because of the enforcement of partitioning.

Figure 12A:
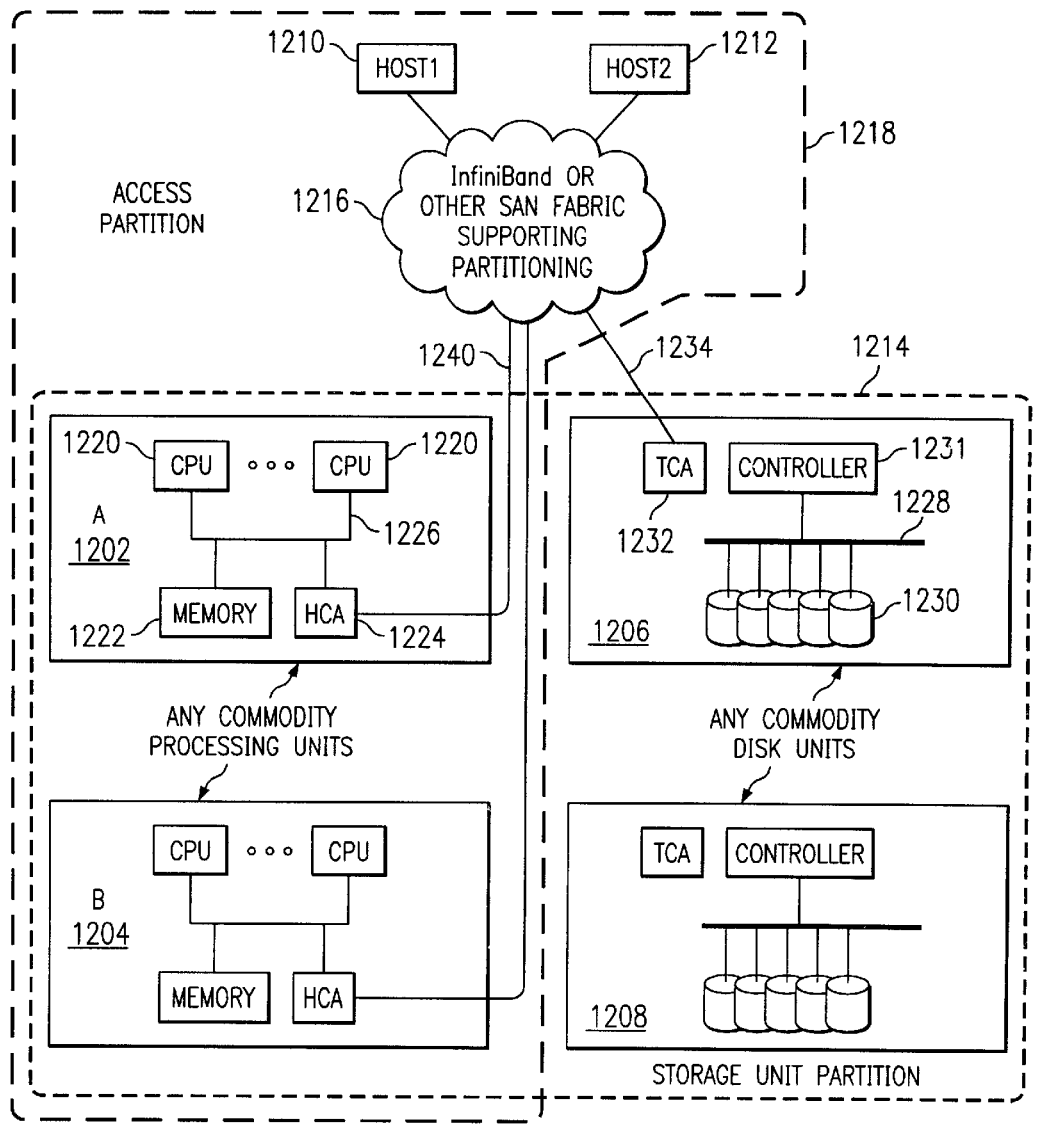
FIG. 12A is block diagram depicting an access partition and storage unit partition of an open storage subsystem according to the present invention.

In FIG. 12A two partitions are depicted. Although two partitions are depicted in FIG. 12A, no limitation on the present invention is intended by FIG. 12A. Rather, the two partitions are only used as a possible exemplary organization of components to illustrate the capabilities of the present invention.

One of the partitions includes a storage unit partition 1214 that comprises processing units 1202, 1204 and storage units 1206, 1208. A SAN fabric 1216 that supports partitioning, couples storage unit partition 1214 with hosts 1210, 1212, respectively. The SAN fabric 1216 can be InfiniBand or any other fabric that supports partitioning in accordance with the present invention.

Further, hosts 1210, 1212 and processing units 1202, 1204 form a second partition, namely an Access Partition 1218. The Access Partition is a partition of components that may access the storage units of the storage unit partition 1214. As can be appreciated, an overlap exits with regard to the storage unit partition 1214 and the Access Partition 1218 in that processing units 1202, 1204 are part of both partitions.

Figure 12B:
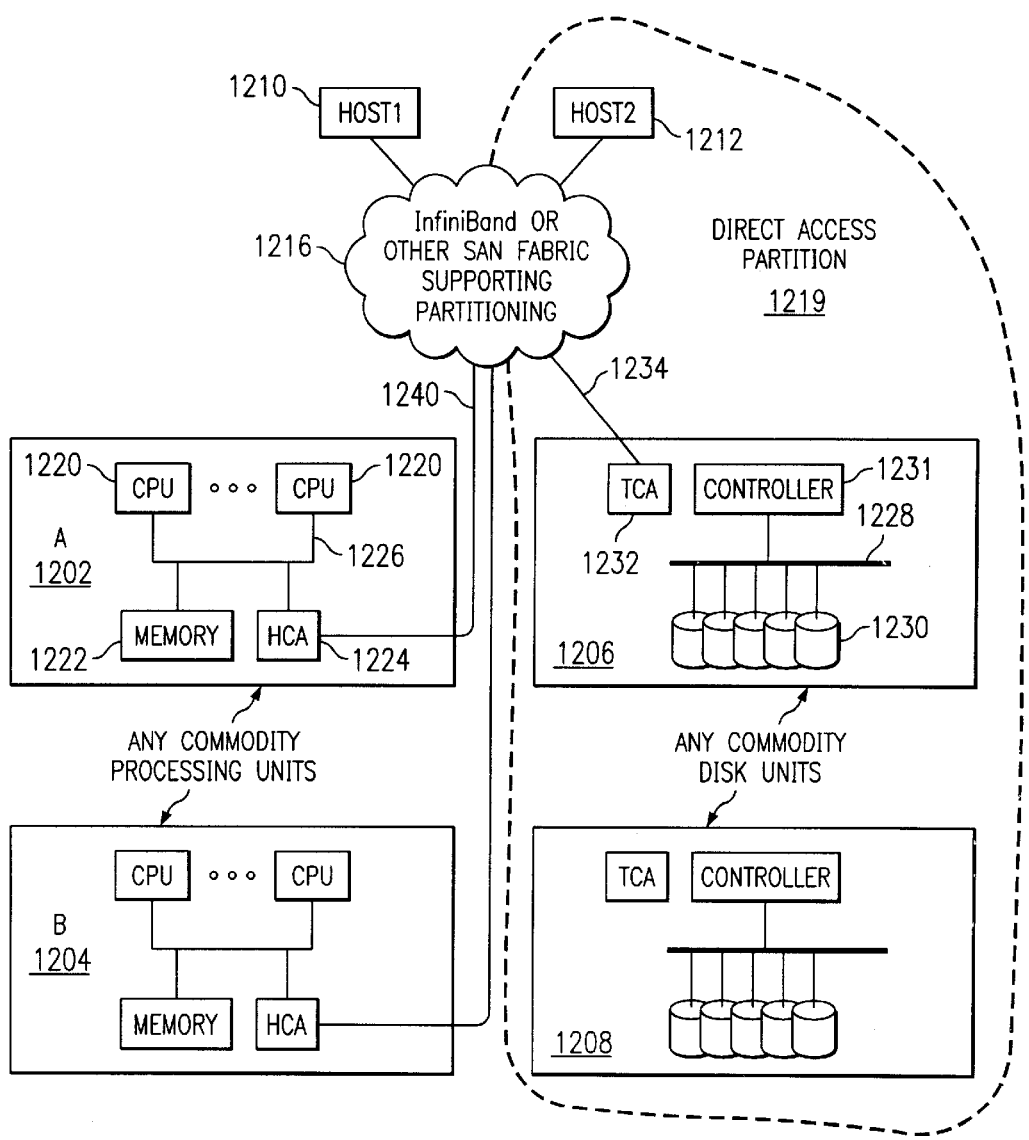
FIG. 12B is a block diagram illustrating a direct access partition of the open storage subsystem.

In addition to the above, it is possible to create a third partition, direct access partition 1219 shown in FIG. 12B, exists which includes host2 1212 and storage units 1206, 1208. This direct access partition 1219 allows the host2 1212 to directly access the storage units 1230 in the storage unit partition 1214. This is useful in cases where storing data from the storage units 1230 in the memory of the processing units 1202 and 1204 is not useful, for example when the stored data is not reused as would be the case when data is audio or video data that simply moves in a stream from the storage units to the hosts. If redundant, e.g., RAID, storage is used in the storage units this direct access may require device drivers, file systems, or other software on the host that is specialized to the storage units' data layout.

As can be appreciated, overlaps exist among the three above mentioned partitions. For example, Host2 1212 resides in access partition 1218, as well as resides in direct access partition 1219, etc.

In addition, processing unit 1202 comprises a set of central processing units (CPU) 1220, a memory 1222, and a Host Channel Adapter (HCA) 1224. An internal interconnect 1226 couples together central processing units (CPU) 1220, a memory 1222, and a Host Channel Adapter (HCA) 1224. A link 1240 couples the processing unit 1202 with SAN 1216.

Processing unit 1204 are similarly constructed as that of processing unit 1202. It is noted that processing units 1202, 1204 can be any commodity processing units. Thus, interchangeability, or interoperability are greatly improved. In other words, the processing units are not restricted as far as the vendor or supplier of these processing units due to the fact that the present invention provides partitioning such that any processing unit may be added to or removed from a partition by properly assigning partitioning keys.

Referring to storage units 1206, 1208, an internal interconnect 1228 couples a set of storage media units, in this case disk units 1230, a controller 1231, and a Target Channel Adapter (TCA) 1232. Disk units 1230 can be any commodity disk units due to the partitioning provided by the present invention. A link 1234 couples SAN 1216 with Target Channel Adapter (TCA) 1232. Storage unit 1208 is similarly constructed.

Messages are sent to the processing units 1202, 1204 from the hosts 1210, 1212 requesting service in a known manner. The processing units 1202, 1204 reuse the same communication fabric to control the storage units 1206, 1208, read data from and write data to them as well. Any function done by known closed systems can be performed in a like manner by the processing units 1202, 1204 of the open storage system. The above mentioned functions include: redundant storage (RAID), space allocation and deallocation, reading and writing data, check-pointing data, and copying data to another medium.

However, the instant invention differs with closed system in that structural differences exist between the two. The closed systems require users to use vendor specific components, whereas the open format solution to storage subsystem can use components from any source, including of course, vendor specific components. Further, the open system of the instant invention allows new components to be added with ease in that scalability is much better than the closed system. In the closed system, if system scalability exists at all, it usually requires vendor specific components.

A key difference between the open format storage subsystem and the known closed storage subsystems is that any processing units 1202, 1204 capable of executing the programs involved can be used. Thus, the storage subsystem function can be purely software, thereby portable among multiple types of processing units 1202, 1204 depending on the needs of the customer. In other words, different types of processors can be used. Similarly, the storage units 1206, 1208 can be any plain storage facility that accepts standard storage command sets emitted by the processing units 1202, 1204 such as SCSI or SSA or any of a number of others.

In addition, it is possible to have additional ports (not shown) on the processing units 1202, 1204 that can be used to provide additional communication with the storage units 1206, 1208. These additional communication ports may provide data flow through the fabric 1216, or may be separate or direct connections (not shown), or provide data flow through a separate fabric (not shown). Providing such separate data flows between the processing units and the storage units may be useful for additional performance.

In the alternative, by providing data flow through a separate fabric, segregation of traffic off the primary communication fabric is possible. Thus, if particular traffic is segregated to a separate fabric during periods of peak usage, some load is taken off the primary communication fabric, and the overall performance of the SAN fabric is improved.

In addition, it is possible to arrange other partitions (not shown) that allow hosts 1210, 1212 to directly communicate with the storage units 1206, 1208. This is useful in cases where caching in the memory of the processing unit is desirable, e.g., when an entire large file is read or written end-to-end without reuse. As can be appreciated, it requires special device drivers on the hosts 1210, 1212 to do this. The hosts 1210, 1212 can deal with the storage formats used by the storage subsystem.

The functionality of the present invention is provided due to the use of limited and full P_Key and P_Key tables with endnodes in the system area network. As previously mentioned, by organizing endnodes in the SAN and assigning P_Keys appropriately, partitions may be generated, such as the storage unit partition 1214, access partition 1218 and direct access partition 1219. The channel adapters of the various endnodes are used to enforce the partition structure based on the P_Keys in headers of data packets sent and received, and the P_Key tables associated with the ports of the channel adapters.

As can be appreciated, due to the partitionability of the present invention, the computation and storage elements of a subsystem are separated into two parts, allowing any processing unit to be used to host the desirable functions, and any media (including commodity media) to be used as the storage units. Doing so allows the desirable functions of storage subsystems to be provided without disadvantages such as the need for vendor specific equipment or component.

The processing units and their associated media are all attached to a SAN, such as an InfiniBand network. All clients of the subsystem are attached to the SAN as well. The SAN is used to send requests from clients to the processing unit and is also used by the processing unit to access the storage media. The clients are prohibited from direct access to the media by partitioning that gives the processing unit exclusive access to the media, while at the same time allowing clients to access the processing unit.

As an alternative embodiment, additional paths (not shown) through the network can be used to provide shorter, faster paths between the processing unit and the media. As yet another embodiment, a partition of the media can be partially "opened" to allow direct access by client systems. This can be done by having the MSM temporarily reassign the P_Keys for ports of a client device.

The ability to partially open a partition is useful in situations where it is undesirable to cache data in the processing unit's memory 1222. For example, when large amounts of data are to be streamed to a client and reuse the data is unlikely. The instant invention improves efficiency and latency of the operation in that the making of an unnecessary copy of the data in the processing unit's memory 1222 is eliminated. This cannot be done using known organization such as a closed storage subsystem, in which data must always be copied into the processing unit's memory since there is no direct media-client connection possible.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system, comprising:
   one or more storage endnodes;
   one or more processing unit endnodes coupled to the one or more storage endnodes;
   at least one host endnode, wherein the one or more storage endnodes and the one or more processing unit endnodes constitute a storage partition, and wherein the at least one host endnode and the one or more processing unit endnodes constitute an access partition; and
   wherein the partitions are defined by partition key tables assigned to the one or more storage endnodes, the one or more processing unit endnodes, and the at least one host endnode, such that the at least one host endnode accesses the one or more storage endnodes through the one or more processing unit endnodes based on the partitions defined in the partition key tables.

2. The system of claim 1, further comprising a system area network coupling the one or more processing unit endnodes to the at least one host endnode.

3. The system of claim 2, wherein the system area network is an InfiniBand system area network.

4. The system of claim 1, wherein the one or more storage endnodes include a set of storage media.

5. The system of claim 4, wherein the set of storage media is a set of non-system specific storage media.

6. The system of claim 1, wherein the one or more processing units are non-system specific processing units.

7. The system of claim 1, wherein the partition key tables assigned to the one or more storage endnodes, the one or more processing unit endnodes and the at least one host endnode are the same partition key table.

8. The system of claim 1, wherein the partition key tables include partition keys, and wherein the partition keys may be either limited partition keys or full partition keys.

9. The system of claim 8, wherein the at least one host endnode is assigned a limited partition key.

10. The system of claim 8, wherein the one or more processing endnodes are assigned full partition keys.

11. The system of claim 8, wherein the one or more storage endnodes are assigned full partition keys.

12. The system of claim 9, wherein the at least one host endnode is temporarily assigned a full partition key to thereby allow direct access to the one or more storage endnodes.

13. The system of claim 9, wherein endnodes with ful partition keys communicate with endnodes with full or limited keys and wherein endnodes with limited partition keys communicate with endnodes with full partition keys.

14. The system of claim 1, wherein the at least one host endnode and the one or more storage endnodes constitute a direct access partition.

15. The system of claim 1, wherein the partitions are enforced by partition identifiers assigned to the one or more storage endnodes, the one or more processing unit endnodes, and the at least one host endnode.

16. A method for forming a storage subsystem, comprising:
providing a plurality of partitionable units of various types, wherein the plurality of partitionable units comprises commodity components having at least one processing commodity component, at least one host component, and at least one storage commodity component; and
partitioning the plurality of partitionable units into a plurality of partitions such that at least one of the at least one processing commodity components exists in more than one partition, wherein partitioning includes assigning one or more partition key tables to the at least one storage commodity component, the at least one processing commodity component, and the at least one host component.

17. The method of claim 16, further comprising providing a system area network coupled to the plurality of partitionable units.

18. The method of claim 17, further comprising providing dedicated connections connecting at least some partitionable units in addition to or instead of the system area network.

19. The method of claim 17, wherein the system area network is an InfiniBand system area network.

20. The method of claim 16, wherein the one or more partition key tables are the same partition key table.

21. The method of claim 16, wherein the partition key tables include partition keys, and wherein the partition keys may be either limited partition keys or full partition keys.

22. The method of claim 21, wherein the at least one host component is assigned a limited partition key.

23. The method of claim 21, wherein the at least one processing commodity component is assigned a full partition key.

24. The method of claim 21, wherein the at least one storage commodity component is assigned a full partition key.

25. The method of claim 21, wherein the at least one host component is temporarily assigned a full partition key to thereby allow direct access to the at least one storage commodity component.

26. The method of claim 21, wherein components with full partition keys communicate with components with full or limited keys and wherein components with limited partition keys communicate with components with full partition keys.

27. The method of claim 16, wherein the partitions are enforced by partition identifiers assigned to the at least one storage commodity component, the at least one processing commodity component, and the at least one host component.

28. A method of forming a storage subsystem in a computer system, comprising:
assigning a host endnode to an access partition of the computer system;
assigning a storage endnode to a storage unit partition of the computer system; and
assigning a processing unit to both the storage unit partition and the access partition, such that the host endnode reads and writes data to the storage endnode via the processing unit due to the processing unit being in both the storage unit partition and the access partition, wherein assigning a host endnode to an access partition of the computer system includes assigning a first partition table to a port of the host endnode, and wherein assigning the processing unit to the access partition of the computer system includes assigning the first partition table to a first port of the processing unit.

29. The method of claim 28, wherein assigning the storage endnode to a storage unit partition includes assigning a second partition table to a port of the storage endnode, and wherein assigning the processing unit to the storage unit partition includes assigning the second partition table to a second port of the processing unit.

30. The method of claim 29, wherein the first and second partition tables include one or more partition keys.

31. The method of claim 30, wherein the partition keys maybe limited partition keys or full partition keys.

32. The method of claim 31, wherein assigning the storage endnode and the processing unit to a storage unit partition further includes assigning a pointer to a full partition key in the second partition table to a queue pair of the port of the storage endnode and a pointer to a full partition key in the second partition table to a queue pair of the second port of the processing unit.

33. The method of claim 31, wherein assigning the host endnode and the processing unit to the access partition further includes assigning a pointer to a limited partition key in the first partition table to a queue pair of the port of the host endnode and a pointer to a full partition key in the first partition table to a queue pair of the first port of the processing unit.

34. The method of claim 31, wherein endnodes with full partitiion keys communicate with endnodes with full or limited partition ksys and wherein endnodes with limited partition keys communicate with endnodes with full partition keys.

35. A computer program product in a computer readable medium for forming a storage subsystem in a computing system, comprising:

first instructions for assigning a host endnode to an access partition of the computer system;

second instructions for assigning a storage endnode to a storage unit partition of the computer system; and third instructions for assigning a processing unit to both the storage unit partition and the access partition, such that the host endnode reads and writes data to the storage endnode via the processing unit due to the processing unit being in both the storage unit partition and the access partition, wherein the first instructions for assigning a host endnode to an access partition of the computer system include instructions for assigning a first partition table to a port of the host endnode, and wherein the third instructions for assigning the processing unit to the access partition of the computer system include instructions for assigning the first partition table to a first port of the processing unit.

36. The computer program product of claim 35, wherein the second instructions for assigning the storage endnode to a storage unit partition include instructions for assigning a second partition table to a port of the storage endnode, and wherein the third instructions for assigning the processing unit to the storage unit partition include instructions for assigning the second partition table to a second port of the processing unit.

37. The computer program product of claim 36, wherein the first and second partition tables include one or more partition keys.

38. The computer program product of claim 37, wherein the partition keys may be limited partition keys or full partition keys.

39. The computer program product of claim 38, wherein the second and third instructions for assigning the storage endnode and the processing unit to a storage unit partition further include instructions for assigning a pointer to a full partition key in the second partition table to a queue pair of the port of the storage endnode and instructions for assigning a pointer to a full partition key in the second partition table to a queue pair of the second port of the processing unit.

40. The computer program product of claim 39, wherein the first and third instructions for assigning the host endnode and the processing unit to the access partition further include instructions for assigning a pointer to a limited partition key in the first partition table to a queue pair of the port of the host endnode and instructions for assigning a pointer to a full partition key in the first partition table to a queue pair of the first port of the processing unit.

41. The computer program product of claim 38, wherein endnodes with full partition keys communicate with endnodes with full or limited partition keys and wherein endnodes with limited partition keys conimunicate with endnodes with full partition keys.

* * * * *

UNITED STATES PATENT AND TRADEMARK OFFICE
CERTIFICATE OF CORRECTION

PATENT NO. : 6,829,685 B2
DATED : December 7, 2004
INVENTOR(S) : Neal et al.

It is certified that error appears in the above-identified patent and that said Letters Patent is hereby corrected as shown below:

Column 19,
Line 34, after "with" delete "ful" and insert -- full --.

Column 21,
Line 2, before "keys" delete "partitiion" and insert -- partition --.
Line 3, after "partition" delete "ksys" and insert -- keys --.

Signed and Sealed this

Eleventh Day of April, 2006

JON W. DUDAS
*Director of the United States Patent and Trademark Office*